2 Sheets—Sheet 1.
W. DOUGLASS.
Machine Gun.
No. 43,903. Patented Aug. 23, 1864.
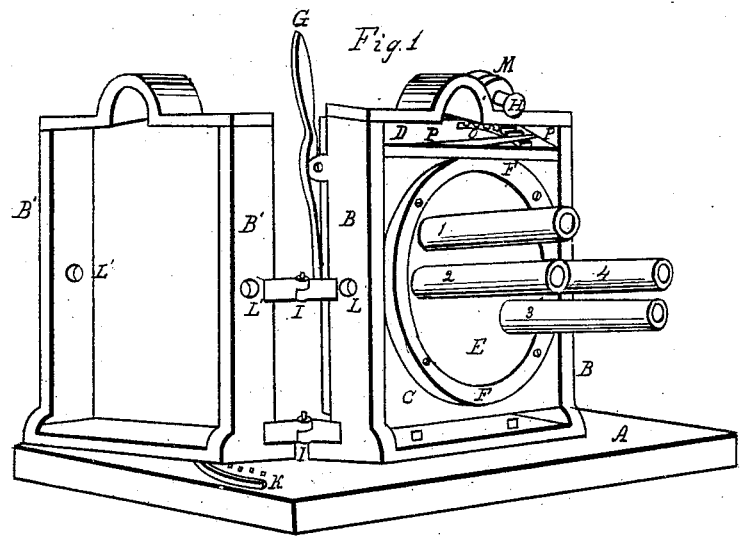
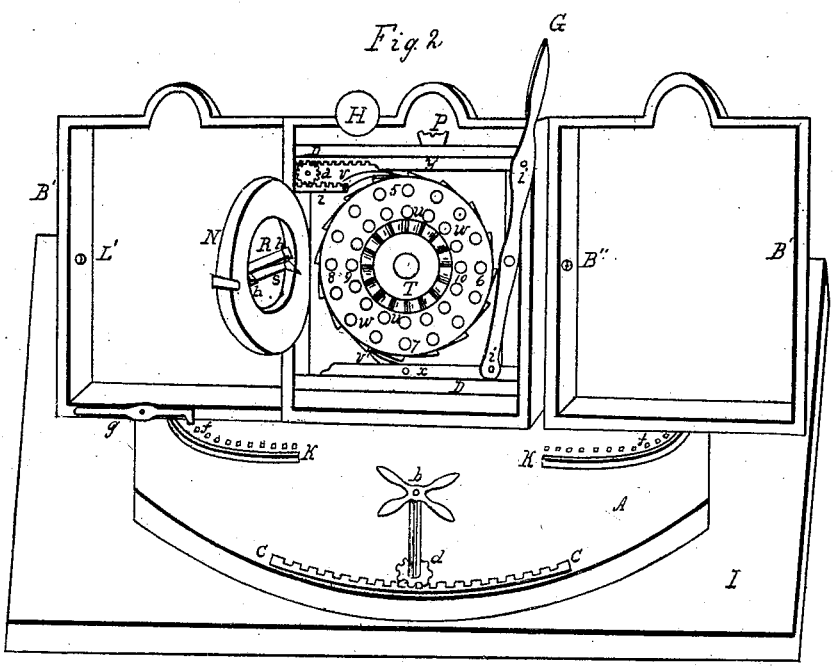
Witnesses
A. B. Richmond
Henry L. Davis
Inventor
William Douglass W. DOUGLASS.
Machine Gun.
No. 43,903.
2 Sheets—Sheet 2.
Patented Aug. 23, 1864.
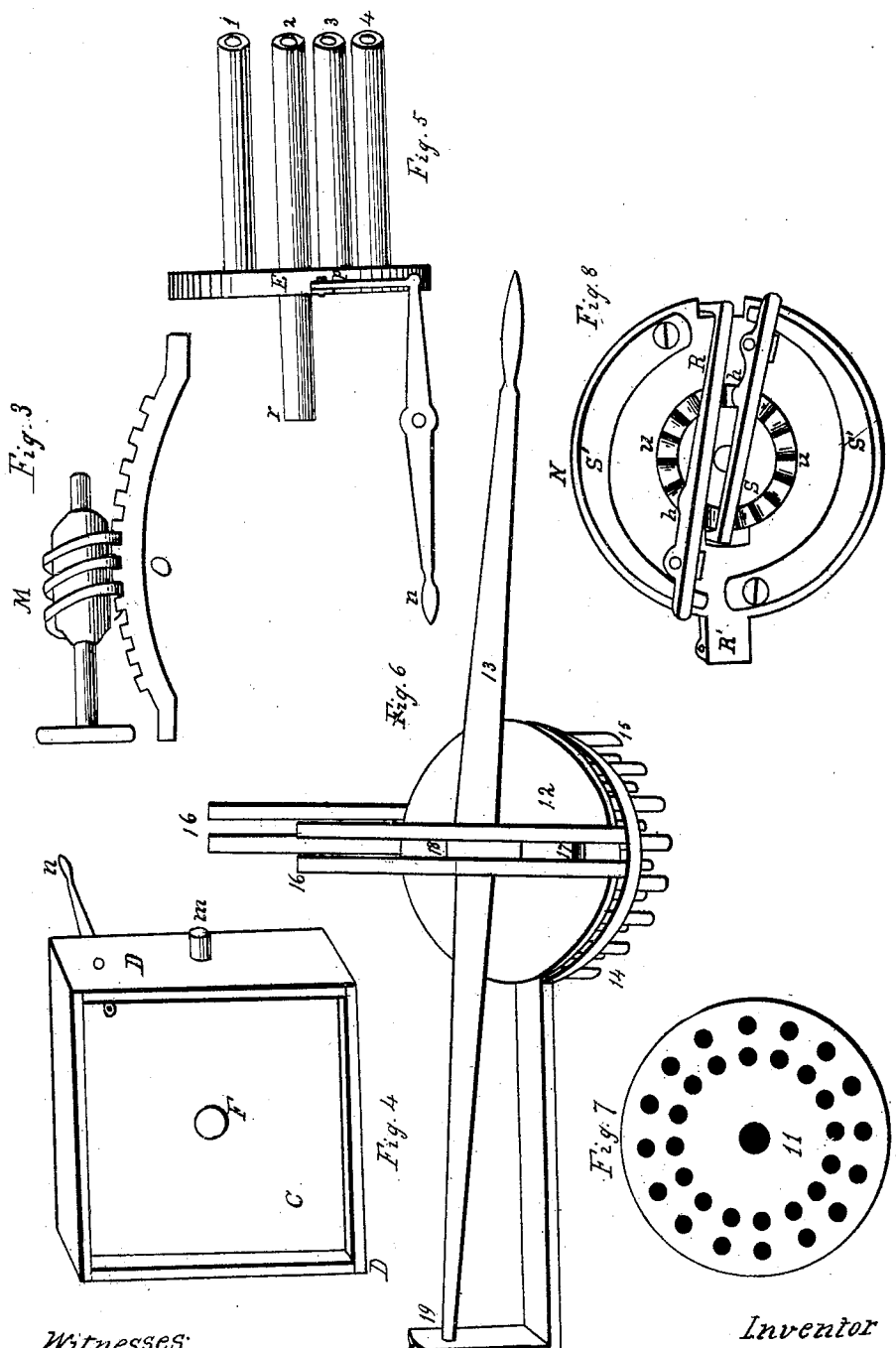
Witnesses
A. B. Richmond
Henry L. Davis
Inventor
William Douglass

UNITED STATES PATENT OFFICE.

WM. DOUGLASS, OF CORRY, PENNSYLVANIA.

IMPROVEMENT IN BATTERY-GUNS.

Specification forming part of Letters Patent No. 43,903, dated August 23, 1864.

*To all whom it may concern:*

Be it known that I, WILLIAM DOUGLASS, of Corry, in the county of Erie, State of Pennsylvania, have invented a new and Improved Fire-Arm and Battery; and I do hereby declare that the following is a full and exact description of the same, reference being had to the accompanying drawings and the letters of reference marked thereon.

Figure 1 is a front and side view of my machine or fire-arm adjusted in working order.

B B is an iron frame bolted on the foundation or platform A. B' B' is an exactly similar frame, attached to the frame B by the hinges I I. B'' B'', Fig. 2, is another similar frame, also attached by hinges in like manner to B B. These frames B' B' and B'' B'' rest on the iron rails K K, Fig. 2, and may be all swung around at right angles to B B, as one of them is shown at Fig. 1, or may be brought in a line, as shown at Fig. 2, or fastened at any angle desired by the pawl G, which falls in the holes *f*, there being a similar pawl on both B' B' and B'' B'', although only one is shown in the drawings. All the machinery that is attached to B B is duplicated in B' B' and B'' B'', the frames and machinery being alike, only that B B is bolted on the platform A, while B' B' and B'' B'' are attached to it by hinges, as before described, and for purposes hereinafter to be mentioned.

D D, Figs. 2 and 1, is another iron frame, (better shown at Fig. 4,) hung on pins, one of which is shown at *m*, Fig. 4, in holes in the frames B B, B' B', and B'' B'', (shown at L and L' L', Fig. 1,) so as to turn freely from a perpendicular position to any required angle, which is done by the toothed segment O and screw M, the segment O being bolted onto the frame D D and the screw M made to turn freely and attached to the frame B B. Fig. 3 represents this screw and segment detached.

C is a strong iron plate, attached to the inside of the frame D D, with a hole, T, Fig. 4, in the center thereof.

E is a circular plate, of iron, made to revolve on the pin R, Fig. 5, in the hole T, and is kept to its place by a collar, F F, Fig. 1, which is bolted to the plate C, and yet permits the plate E to revolve. In this plate E are four gun-barrels screwed into the same, and by means of the lever *n* and connecting-rod *p* may be so adjusted that either 2 4 or 1 3 can be brought in a horizontal position for firing, as only two of them are used at a time, and when they become heated by operating the lever the other two can be used while the others are cooling.

Fig. 2 represents the breech end of my fire-arm.

W W is a cylinder not unlike the cylinder in the revolving pistols now in use, where percussion-cartridges are used. Any number of charge-chambers desired may be used in this cylinder. This cylinder is also hung and revolves on the pin *r*, which passes through the hole T. Around the periphery of the cylinder *w w* are ratchet-teeth, as shown in the drawings.

X is a slide with a pawl, *v*, which operates the ratchet-teeth in the bottom of the cylinder. Y is also a slide with cogs on the end of the same, which revolve the toothed wheel *a*, which moves the ratchet-bar Z, also toothed or cogged, in the end of which is the pawl *v*, which operates the ratchet-teeth on the upper side of the cylinder *w w*. The slides *y* and *x* are attached to the lever G at *i i*, and by this construction a movement of the lever either to the right or left will cause the cylinder *w w* to revolve the pawls *v* and *v'*, acting alternately, as described.

N is the lock, which is better shown at Fig. 8. This lock is hung on the frame D D by a hinge, R', Fig. 8, and may be opened out in the position shown at Fig. 2 to permit the cylinder *w w* to be removed for the purpose of loading, and then may be shut against the cylinder *w w* and fastened by a spring-catch or any other suitable mechanical device. Fig. 8 represents the position of this lock when the same is shut against the cylinder as aforesaid.

R S represent the cocks or hammers; S' S', the springs operating the same. It will be observed that S is shorter than R, as it strikes the cartridges in the inside circle, 9 10, of the charge-chambers in the cylinder *w w*, Fig. 2, while R strikes the cartridges in the outer circle, 5 6 7 8.

U U, Figs. 2 and 8, is a ratchet or toothed wheel on the cylinder *w w*, and on the cocks R S, at *h h*, is a projection, which rests on these teeth, and as the cylinder revolves, by operating the lever G it causes the hammers to strike the cartridges in the cylinder as they rise and fall at the passage of every tooth.

P P is a sight, Fig. 1, and by means of the screw and segment M O the barrels can be raised or depressed, as desired, the frame D D turning on the pins, as described. The platform A rests upon another platform, I, and may be swung around on this platform by the cogged wheel and capstan $b\ d$ and the cogged segments $c\ c$, Fig. 2. By this construction the machine may be quickly changed from front to flank.

This fire-arm may be constructed of any desired size, with any desired number of cylinders and barrels, all made to operate as described, and the same may be placed on wheels for field operations, or may be stationary for fortifications, while the whole can be inclosed in bullet-proof armor and one machine operated with two or three men. This machine can be so arranged that the middle section can fire in front, and the side sections at any desired angle, as the three sections are constructed alike, operated the same, as heretofore described.

Fig. 6 represents the apparatus for loading the cylinder $w\ w$.

12 is an iron plate with the same number of runners 14 15 attached to it that there are charge-chambers in the cylinder $w\ w$. This plate moves up and down by the lever 13 in the guide-posts 16 16.

11, Fig. 7, is a cylinder, of wood or other suitable material, the same size of the charge-cylinder $w\ w$. In this cylinder the cartridges are placed, and any number of them can be carried in the ammunition-box, and to load the fire-arm the lock is opened in the position shown in Fig. 2, the cylinder $w\ w$ is removed and laid down, the cylinder 11 containing the charges or cartridges placed on the same, both then placed under 12, Fig. 6, and then, by depressing the lever 13, the cartridges are all at the same time forced into the cylinder $w\ w$, as the holes in 11 are large enough to let them pass through.

What I claim as my invention, and desire to secure by Letters Patent of the United States, is as follows, to wit:

1. The plate E, with the four gun-barrels attached, the same operated by the lever N, or its equivalent, so that two of them can be brought in a horizontal position, as described, when the same are constructed as described, and in the aforesaid combination.

2. The cylinder $w\ w$, in combination with the lever G, the slides $y\ x$, and the pawls $v\ v'$, and the ratchet-wheel $u\ u$, in combination with the lock, Fig. 8, constructed as described, and in the aforesaid combination, for the purposes set forth.

3. The iron frames D D, hung on pivots in the frames B B B' B' B'' B'', in combination with the plate E, the cylinder $w\ w$, the lock, Fig. 8, when the same is constructed as described, in the aforesaid combination, for the purposes set forth.

WILLIAM DOUGLASS.

Witnesses:
A. B. RICHMOND,
HENRY L. DAVIS.